No. 888,426.  
PATENTED MAY 19, 1908.
L. B. LEGGE.
CASTER.
APPLICATION FILED FEB. 26, 1908.
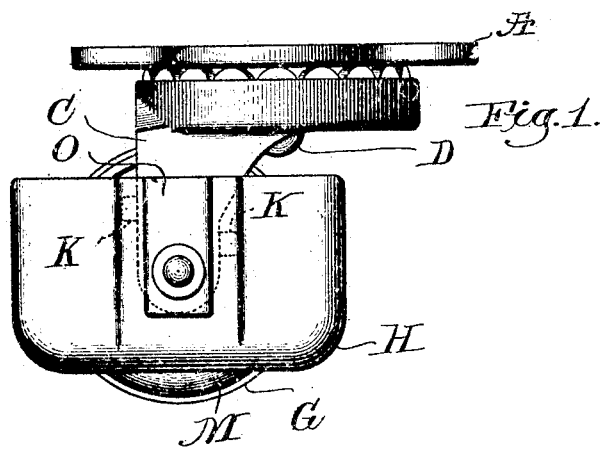
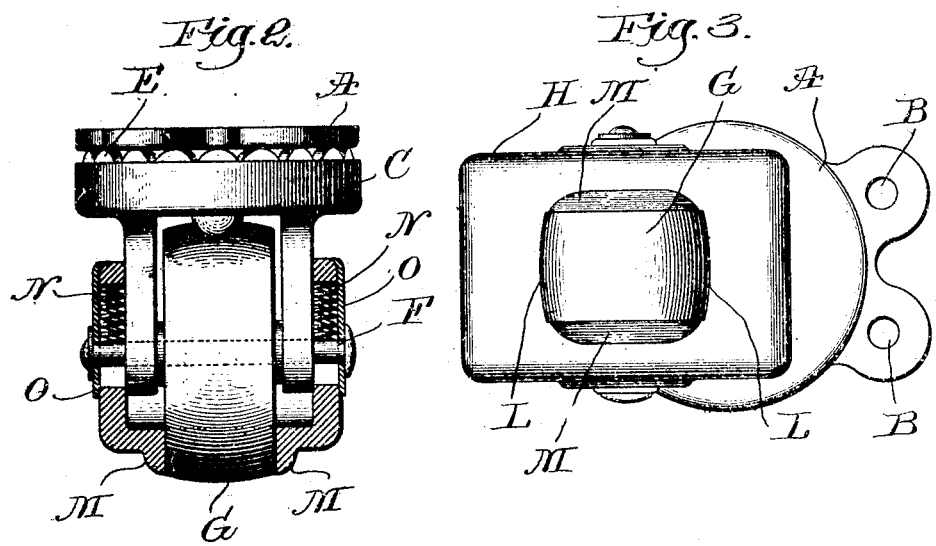
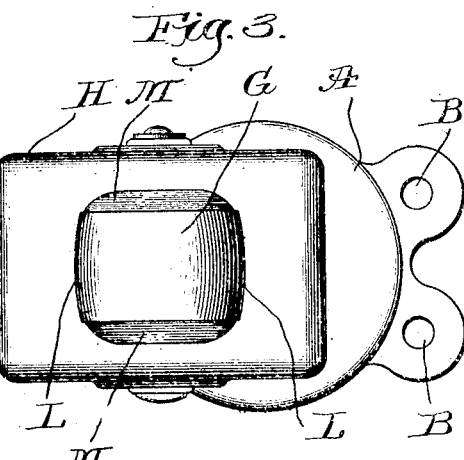
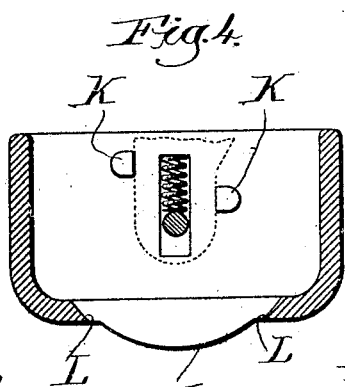
Witnesses:
Thomas J. Drummond,
Joseph M. Ward.
Inventor.
Lionel B. Legge,
by Crosby & Gregory
Attys.

UNITED STATES PATENT OFFICE.

LIONEL B. LEGGE, OF STOUGHTON, MASSACHUSETTS, ASSIGNOR OF ONE-HALF TO DENNIS W. TOOMEY, OF STOUGHTON, MASSACHUSETTS.

CASTER.

No. 888,426.  Specification of Letters Patent.  Patented May 19, 1908.

Application filed February 26, 1908. Serial No. 417,826.

*To all whom it may concern:*

Be it known that I, LIONEL B. LEGGE, a subject of the King of Great Britain, and a resident of Stoughton, in the county of Norfolk and State of Massachusetts, have invented an Improvement in Casters, of which the following description, in connection with the accompanying drawing, is a specification, like letters on the drawing representing like parts.

This invention relates to a device for keeping a caster free from dirt and such objects as might be picked up by the roller of the caster, and is particularly designed for use in connection with shoe racks such as employed in shoe factories for the transferring of shoes, during the process of manufacture, from one point to another throughout the factory.

The floor of a shoe factory over which the casters pass has scattered over it quantities of scraps occurring in the manufacture of the shoes, and which adhere readily to the roller of the caster. These scraps comprise bits of waxed thread, bits of leather and lining more or less covered with rubber cement, and various other materials. These scraps when picked up by the roller are crowded into the caster support so as to prevent the operation of the caster, and frequently also the bearing or journal of the caster roller becomes clogged up, so that the caster becomes useless. In any event, the caster requires thorough and frequent cleaning, requiring much time and expense.

The present invention provides a casing surrounding or enveloping the roller and its support so as to exclude all foreign matter and provided with an opening through which the portion of the caster resting upon the floor protrudes, the front and rear edges of this opening being held in yielding contact with the periphery of the casing so as to keep it scraped clean, and the side edges of the opening protecting the sides of the protruding portion of the caster.

The invention will more fully appear from the accompanying description and drawings and will be particularly pointed out in the claims.

The drawings represent an ordinary form of caster provided with a casing embodying the invention.

In the drawings, Figure 1 is a side elevation of a caster provided with a casing embodying the invention. Fig. 2 is an end view, partially in vertical cross-section, of a device. Fig. 3 is a bottom plan view. Fig. 4 is a longitudinal sectional view of the casing.

The caster itself may be of any suitable form, and is herein shown as of the roller-bearing type. It is shown as comprising a base A adapted to be attached by screws for which purpose the holes B are provided to the shoe-rack or other article, a roller-support C, pivoted to the base A by a bolt D, bearing rolls E inserted between the base A and the support C, a journal pin F passing through depending arms of the support C, and a roller G mounted on said bearing pin.

The casing comprises a hollow box-like structure H, adapted to surround and fit over the roller G and the lower portion of the support C. The casing is mounted to slide vertically on the support. It is slotted at each side to receive the bearing or journal pin F and to insure its vertical movement is provided with lugs K, guiding against the edges of the depending portion of the support C.

The casing is provided at the bottom with an opening to allow the caster roller G to bear upon the floor. The front and rear edges L of this opening normally contact with and scrape the periphery of the roller G. The side edges of this opening are provided with depending segmental flanges M, which protect the sides of the projecting portions of the roller.

Coiled springs N are inserted in the slots in the side of the casing and act against the bearing pin F and the upper portion of the casing so that the casing is constantly held upward with the edges L, L of the opening contacting against the periphery of the roller, and these springs are of such a strength that this contact is sufficient to scrape the caster roller without interfering with its operation. Small plates O are pivoted upon the journal pin F and at their upper ends catch over the edge of the casing and act to conceal the springs N in the slots.

It will thus be seen that the caster is protected from the collection of any dirt, threads, scraps of leather, or other materials as the caster travels along, and the periphery of the caster is kept scraped clean, thus insuring its easy and proper operation at all times.

Having described my invention, what I claim as new and desire to secure by Letters Patent, is:

1. A caster comprising a support, a roller mounted therein, a casing surrounding said support and roller mounted to slide vertically on said support and presenting an opening at the bottom for the roller, the front and rear edges of the said opening normally contacting with and scraping the roller periphery.

2. A caster comprising a support, a roller mounted therein, a casing surrounding said support and roller mounted to slide vertically on said support and presenting an opening at the bottom for the roller, the front and rear edges of the said opening normally contacting with and scraping the roller periphery, and depending segmental flanges at the sides of said opening to protect the sides of the projecting portion of the roller.

3. A caster comprising a support, a roller mounted therein, a casing surrounding said support and roller mounted to slide vertically on said support and presenting an opening at the bottom for the roller, springs interposed between said support and acting to raise the latter so that the front and rear edges of the said opening normally contact with and scrape the roller periphery.

4. A caster comprising a support, a roller mounted therein, a casing surrounding said support and roller mounted to slide vertically on said support and presenting an opening at the bottom for the roller, springs interposed between said support and acting to raise the latter so that the front and rear edges of the said opening normally contact with and scrape the roller periphery, and depending segmental flanges at the sides of said opening to protect the sides of the projecting portion of the roller.

5. A caster comprising a support presenting depending portions, a roller journaled therein, a box-like casing slotted at each side to receive the roller journal, springs in said slots resting on said roller journal and against the upper end of the slots, and opening at the bottom of the casing for the roller, depending segmental flanges at the side of said opening whereby the said casing is normally held elevated with the front and rear edges of said opening contacting with and scraping the roller periphery while the segmental flanges protect the sides of the projecting portion of the roller.

In testimony whereof, I have signed my name to this specification, in the presence of two subscribing witnesses.

LIONEL B. LEGGE.

Witnesses:
THOMAS J. DRUMMOND,
JOHN C. EDWARDS.